United States Patent Office 2,768,742
Patented Oct. 30, 1956

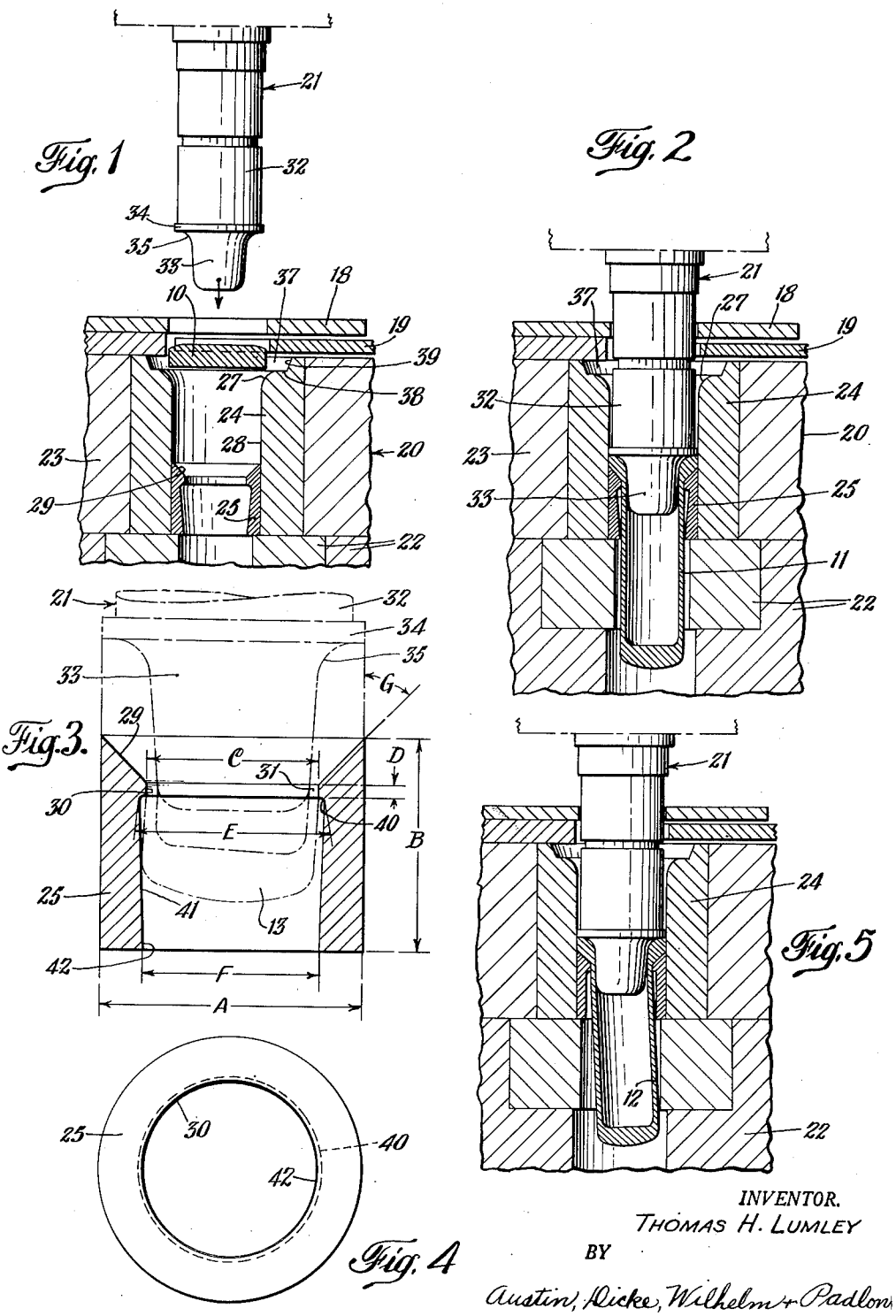

2,768,742

IMPACT EXTRUSION WITH TUBE STRAIGHTENING PROVISION

Thomas H. Lumley, West Haven, Conn., assignor to Olin Mathieson Chemical Corporation, a corporation of Virginia Application November 4, 1952, Serial No. 318,688

1 Claim. (Cl. 207—6)

The invention relates to the extrusion of tubular articles, such as used in the manufacture of cartridge shells; and more particularly to a novel form of extrusion in which the blanks are inherently extruded into straight tubes and production of bent tubes avoided.

The present invention is particularly useful with extruding methods and apparatus hereinafter sometimes referred to as the Blair practice. This practice is disclosed in application, Serial No. 774,913, filed September 19, 1947, in the name of Emile Blair (now Patent No. 2,630,916, granted March 10, 1953), and in application, Serial No. 274,453, filed March 1, 1952, in the name of George A. Foisy (division of application, Serial No. 191,622, filed October 23, 1950, now Patent No. 2,673,644, issued March 30, 1954). These prior applications are made a part of the present application by reference.

The Blair application relates to the cupping and extrusion of a tubular article from a square, or other polygonal, disc blank in a single pass of the press. The Foisy application provides a centering nest, at the top of the die in the Blair practice, for properly centering the disc blanks in the die, regardless of tolerance variations in the size of the blanks.

In general, extrusion according to either of the prior applications has given excellent results. However, in certain cases, certain of the extruded tubes have been bent slightly. The reason for this is not completely understood; but it is thought to be due to lack of complete symmetry in the extrusion press or lack of homogeneity in the blank, or failure to completely center the blank with respect to the press.

In general, it has not been necessary to scrap such bent tubes since subsequent drawing operations (which are necessary in the manufacture of tubular articles, such as cartridge shells) will automatically straighten the tubes. However, there is always the possibility that such subsequent straightening process might adversely affect the resulting tube. Accordingly, an object of the present invention is to prevent the extrusion of bent tubes by straightening the tubes during the actual extrusion process so that the extruded tubes, as they come from the press, will be consistently straight and of high quality.

The invention also consists in certain new and original features and combinations hereinafter set forth and claimed.

Although the novel features which are believed to be characteristic of this invention will be particularly pointed out in the claim appended hereto, the invention itself, as to its objects and advantages, and the manner in which it may be carried out, may be better understood by referring to the following description taken in connection with the accompanying drawings forming a part hereof, in which:

Fig. 1 illustrates one form of impact extrusion press, according to the invention, showing a blank in the centering nest ready for the extrusion operation;

Fig. 2 shows the position of the press with the plunger in its lowermost position and showing the extruded tube;

Fig. 3 is a diagram showing an enlarged extrusion bushing with its gate surface, relief recess, straightening surface, and exit surface; and showing also the position of the plunger at an intermediate point of the extrusion operation, with the tube only partly extruded; and illustrating, theoretically, the correcting action of the straightening surface on a tube which is initially being extruded crookedly;

Fig. 4 is a bottom plan view of the die bushing of Fig. 3; and

Fig. 5 is a section of a press according to the Foisy application, showing a tube in completely extruded position, the tube having been extruded non-uniformly so as to be curved or crooked.

In the following description and in the claim, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

The structure of the preferred form of press will first be described. Referring to Fig. 1, the press comprises a stationary die 20 and a vertically movable plunger 21. At the top of the die is cover plate 18 and cross slide 19, with openings to let the plunger 21 pass through. These form part of a feeding mechanism for feeding the blanks 10 into position and form no part of the present invention; hence they will not be further described here.

The die 20 comprises a support 22 on which rests a base 23. The base holds an extrusion ring 24 within which is extrusion bushing 25. The extrusion ring 24 has a flaring mouth 27 merging into cylindrical bore 28. At the top of the flaring mouth 27 is a centering nest 37 comprising an annular plane seat or shoulder 38 with an annular tapered or conical side wall 39.

Extrusion bushing 25 has a beveled, annular squeeze surface 29 and an extrusion gate flange 30. Below flange 30 the internal diameter is relieved to provide an enlarged relief recess 40, and the internal surface of the die bushing converges inwardly and downwardly to provide a conical straightening surface 41 terminating in the exit edge 42.

These parts of the bushing 25 have a definite relationship. The clearance recess 40 must be somewhat larger than the gate surface 30 to provide necessary relief for the extrusion operation. The exit edge 42 must have a diameter slightly larger than the gate diameter 30, but sufficiently small to force the extruding blank back into line.

An example will be given of these important dimensions of an actual die bushing used for practicing the invention. Referring to Fig. 3, dimension A is .901 plus .0005 or minus .000. B is .750 plus or minus .001. C is .600 plus .000 or minus .001. D is ⅝₄. E is .615 plus or minus .002. F is .602 plus .002 or minus .000 (all of the foregoing dimensions being in inches). G is 45°.

The plunger 21 comprises a shank 32 which is suitably secured to power mechanism (not shown) for driving the punch downwardly, as will be understood by those skilled in the art. The shank 32 has a centering flange or collar 34 having a guide fit in the circular bore 28. The bottom of flange 34 has a beveled annular squeeze surface 35, below which is a tapered former or plug 33.

The operation of the cupping and extrusion plunger 21 will now be described. The square blank 10 is placed in the centering nest 37, as shown in Fig. 1; the plunger 21 is then in its uppermost position which will be somewhat above that shown in Fig. 1. After proper oiling of the cupping and die surfaces, the press will be operated, causing the plunger 21 to move downwardly under high speed and with great force. This operation first cups the blank, providing a cup with a serrate edge, and then extrudes the cupped blank into the tubular product 11 as illustrated in Fig. 2 which also illustrates the lowermost position of the plunger.

As explained in the Foisy application, the centering nest 37 centers the square or other polygonal disc blank 10 in the circular seat 38. If a blank 10 has the maximum tolerance limit, a corner of the blank may be positioned part way up the tapered side wall 39. The initial engagement of the plunger 21 with such a large blank acts to wedge the high corners of the blank down the tapered side wall 39 against the seat 38 to slightly compress all four corners of the large blank, completely centering the blank. If the blank has the minimum tolerance limit, it will seat snugly against the seat 38 and against the bottom of the tapered side wall 39.

The action of the conical straightening surface 41 will be better understood by considering Figs. 3 and 5. It will be understood that a crooked blank 12 made by the Foisy process (for example), as illustrated in Fig. 5, is not necessarily straight throughout the major portion of its length, but may be slightly curved all the way from the bottom to top.

As above stated, the precise reason for the bending of these tubes during extrusion is not entirely understood, but is believed to be caused by some non-uniformity either in the press or in the blank itself. At any rate, positive control of the metal flow in the blank as it is being extruded, according to the invention, has overcome the above-mentioned imperfections.

As seen in Fig. 3, the tapered side wall of the former 33 and the gate flange 30 of the die bushing form a gate 31 through which the plastic metal flows. If the former 33 has a cylindrical side wall, this gate 31 remains of substantially uniform size throughout the extrusion operation. If the former has a tapered side wall, as indicated at 33, the gate 31 will decrease slightly as the plunger descends, causing the wall of tube 11 to be slightly thinner at the top than at the bottom.

In either case, if the incipient extruded product 13 tends to flow laterally out of true axial alignment into the necessary relief clearance space 40, it engages the conical straightening surface 41 which guides the extruded product back into true axial position. This guiding action takes place while the metal is plastic, under the tremendous pressure generated by the press, and flowing through the gate 31, and does not adversely affect the excellent physical properties of the completely extruded tube.

Thus the above invention solves the problem of bent tubes which has always been present in impact extrusion work under the Blair practice. While as above stated such bent tubes could most generally be straightened during the subsequent drawing operations, they sometimes require special precautions in handling, and there is always the possibility that the subsequent straightening process might affect the tube adversely. With the present invention, the straightening is done while the metal is still plastic; and due to the particular straightening method, any slight initial tendency to crooked extrusion is corrected in its incipient stage, and the extruded tubes are all substantially straight and of high quality.

While certain novel features of the invention have been disclosed herein, and are pointed out in the annexed claim, it will be understood that various omissions, substitutions and changes may be made by those skilled in the art without departing from the spirit of the invention.

What is claimed is:

A die for impact extrusion of a tube, said die having a cylindrical opening, an integral extrusion and straightening bushing fitted into the lower part of said opening, the entrance end of said bushing having an inwardly and downwardly beveled squeeze surface terminating in an axial gate surface, said bushing having a relief recess immediately under said gate surface, the diameter of said relief recess being only slightly greater than the diameter of said gate surface, said bushing having at its extreme lower end a circumferential exit edge, and a downwardly and inwardly tapering conical straightening surface extending all the way from said relief recess to said exit edge, said die having no further guiding means below said exit edge, the length of said straightening surface approximating the diameter of said gate surface, said exit edge being intermediate in diameter between said gate surface and said relief recess to pass the tube being extruded and to realign any partially extruded disaligned tube, whereby the leading part of any partially extruded, disaligned tube first strikes said straightening surface and then slides against said straightening surface to said exit edge to become realigned, and thereafter the side wall of said partially extruded but realigned tube slides against said exit edge and is thereby held substantially aligned until the extrusion operation is completed.

References Cited in the file of this patent

UNITED STATES PATENTS

| | | |
|---|---|---|
| 2,559,679 | See | July 10, 1951 |
| 2,602,539 | See | July 8, 1952 |
| 2,630,916 | Blair | Mar. 10, 1953 |